July 10, 1951

H. G. FAY 2,559,861

MOLD FOR CENTERING RELATIVELY LARGE UNCENTERED LENSES IN PLASTIC MOUNTINGS

Filed Oct. 7, 1950

HOWARD G. FAY
Inventor

By Daniel J. Mayne
Walter O. Hodsdon

Attorneys

Patented July 10, 1951

2,559,861

UNITED STATES PATENT OFFICE 2,559,861

MOLD FOR CENTERING RELATIVELY LARGE UNCENTERED LENSES IN PLASTIC MOUNTINGS

Howard G. Fay, Rochester, N. Y., assignor to Eastman Kodak Company, Rochester, N. Y., a corporation of New Jersey Application October 7, 1950, Serial No. 189,033

6 Claims. (Cl. 18—36)

This invention relates to apparatus for optically centering uncentered lenses and for forming mountings on such optically centered lenses, and more particularly to an injection-type mold, having multiple co-acting pairs of lens centering members, which is adaptable for molding a plastic mounting onto a relatively large diameter lens which has been centered by the mold.

Heretofore it has been the practice to center optical lenses by grinding the periphery of the lens in a lathe to make its optical center coincide with its geometrical center. In some cases small errors were introduced due to the difficulty of properly aligning the lens in the lathe under sufficient pressure to withstand the grinding action.

The lens centering technique and the molding of mountings on lenses which have been optically centered by the mold is disclosed in Wood Patent 2,304,984 of December 15, 1942, and Simmons Patent 2,259,006 of October 14, 1941.

These patents describe lens centering techniques and apparatus including an injection-type mold having lens centering zonal clamping members positioned in the mold. The zonal clamps engage the uncentered lens on either side. The difference in thickness of any lens between its paraxial and marginal zones will, as the clamps are applied, cause the uncentered lens to slide to the position wherein its optic axis is centered in the clamp. Even a one-dioptic spectacle lens, which, of course, has very little differential in thickness over its area, will repeatedly center itself in the zonal clamps within one-thousandth of an inch as they exert an optimum pressure on the lens. Mention is also made in these patents that the zonal clamps may be vibrated or rotated to enhance the accuracy of the centering operation. This additional movement eliminates the effect of the slight friction which exists between the lens being centered and the clamping member. The theory of the operation of such zonal clamps is discussed at some length in the above-mentioned patents and need not be repeated here.

However, it is apparent from a reading of these patents, no provision is made in the mold there described for rotating the clamping members so that this desirable final centering correction could be made automatically. The rotational adjustment, if any, was usually made manually by an operator placing his fingers within the mold and turning one or both of the zonal clamping members. This was found to be hazardous and time consuming, particularly in the case of a multiple cavity mold, as well as unreliable. The need of a lens centering injection-type mold having provision for automatically rotating the lens clamp thus became apparent and one form of lens centering mold in which the zonal clamping members are automatically rotated is described and claimed in my co-pending application Ser. No. 141,060, filed January 28, 1950, for "Mold for Centering Lenses in Plastic Mounting."

In carrying out such lens centering operations and molding plastic rims thereon, the inner wall of the mold cavity is defined, at least in part, by the outer surface of the zonal clamps. In the case of lenses having a diameter only a little greater than the diameter of the zonal clamps, a molded rim covering only a desired portion of the perimeter of the lens can be molded onto the lens. In the case of lenses having a diameter considerably greater than the diameter of the zonal clamps, too great an area of the lens would be covered by the plastic rim were the outer surface of the zonal clamp employed as the inner wall of the mold cavity. On the other hand, it is desirable for best centering results and for purposes of general machine design, not to make the primary zonal clamping members of a too large diameter as compared to the diameter of the lens.

An object, therefore, of the present invention is to provide an improved lens centering injection mold which is adapted to effectively center an uncentered lens and to restrict the molded rim on the lens to less than the space between a primary lens centering member and the periphery of a lens.

Another object of the invention is to provide a lens centering injection mold for centering relatively large diameter uncentered lenses having primary lens centering members and secondary lens centering members, the latter of which also define at least a portion of the inner wall of the mold cavity.

Still another object is to provide a lens centering injection mold for centering relatively large diameter uncentered lenses in which means are provided for centering the lens to a high degree of accuracy and similar means are provided for further adjusting the position of the lens to overcome frictional resistance between the lens and the first centering means.

Other objects and advantages of the present invention will be more fully understood from the following detailed description and accompanying drawings in which.

Similar parts are identified by the same numerals in these drawings.

Figure 1:
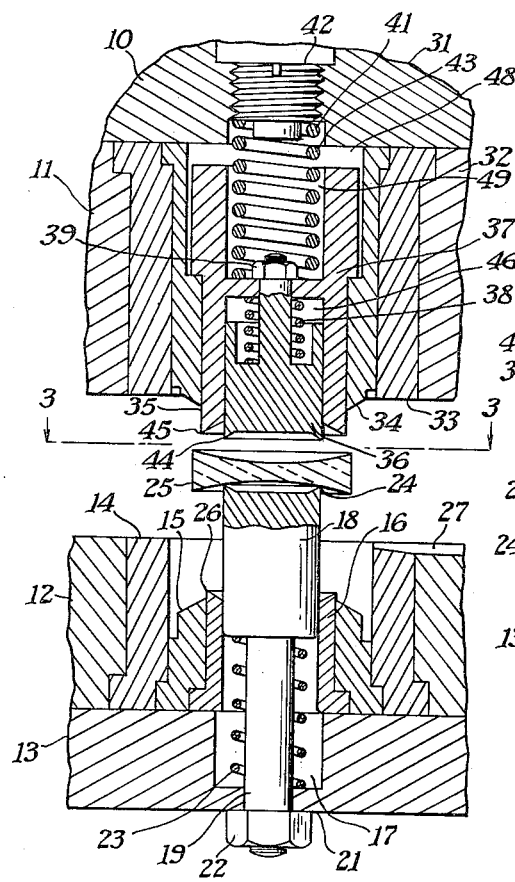
Fig. 1 is an elevational view partly in section of one embodiment of the injection mold of the invention showing the mold in an open position and a lens therein positioned for centering and for molding a lens mounting thereon.

Referring to Fig. 1 there is shown an injection mold 10 comprising an upper mold block 11 and a lower mold block 12 one or both of which may be moved into engagement with the other as by the usual hydraulic pistons of an injection molding machine not shown.

Figure 2:
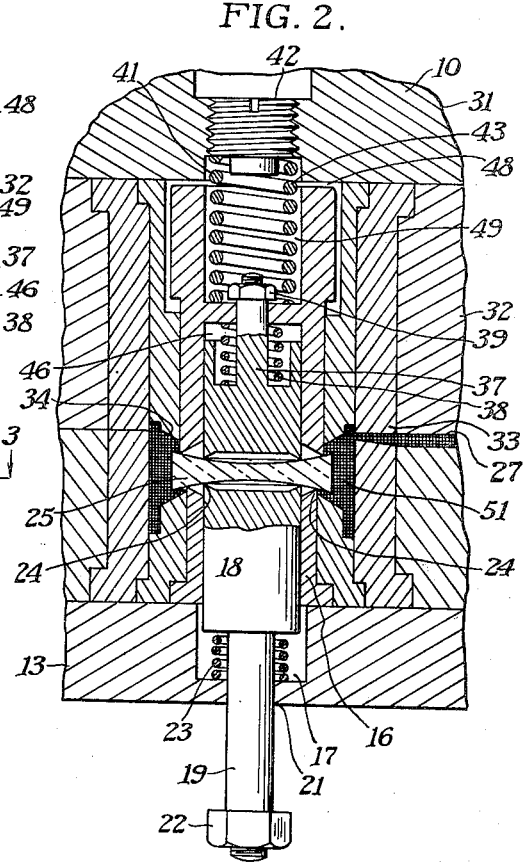
Fig. 2 is a similar view of the mold in which the mold is completely closed and a plastic composition has been injected around the finally centered lens.

The lower mold block 12 comprises associated mold parts 13, 14, 15, and 16, the latter defining in part a piston cylinder 17 in which piston 18 is free to move in a vertical direction. Piston 18 is supported on piston rod 19 which moves through aperture 21 in mold member 13. The upward movement of piston 18 is limited by nut 22. A spring 23 limits movement of piston 18 in a downward direction and returns the piston 18 to the position shown in Fig. 1 when mold blocks 11 and 12 are moved apart, as when the injection mold is opened between injection strokes. The face of the piston 18 has an integral ring thereon which constitutes the lower primary zonal clamp 24. Lens 25 is shown resting on zonal clamp 24. This lens is one whose optical center does not correspond to its geometric center. The secondary zonal clamp comprises a thin integral ring 26 on the upper end of mold member 16. Secondary zonal clamp 26 moves into contact with lens 25 when the mold blocks 11 and 12 are pushed together in a closed position as shown in Fig. 2. A gate through which plastic material can be introduced into the closed mold 10 is shown at 27. The mold cavity in which the plastic is formed into a mounting for lens 25 will be further described in connection with Fig. 2.

The upper mold block 11 comprises mold parts 31, 32, 33, 34 and 35. Part 35 defines in in effect a cylinder 46 through which piston 36 moves in a vertical direction as it alternately contacts and is moved out of contact with lens 25. The face of piston 36 has an integral ring thereon which constitutes the upper primary zonal clamp 44. A rod 37 is attached to piston 36 and it moves through an aperture 47 in member 35 in accordance with the movement of the piston. A nut 39 on rod 37 limits the downward thrust of piston 36. When the mold 10 is open as shown in Fig. 1 the piston is forced into the position in relation to member 35 as shown in Fig. 1 by spring 38.

The upper secondary zonal clamping member in the upper mold block constitutes an integral ring 45 on the end of member 35. Member 35 can move in a vertical movement in a cylinder 48 in member 34. A spring 41 is mounted in an aperture 49 in the upper end of member 35 and exerts its force between member 35 and a plug 42 which is mounted in a tapped hole in mold part 31. When the mold 10 is closed, as in Fig. 2, both springs 38 and 41 are compressed and tend to exert pressure through the respective zonal clamping members 44 and 45 on the lens.

Figure 3:
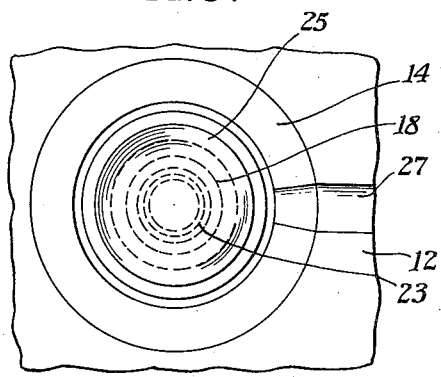
Fig. 3 is a cross sectional view taken on the lines 3—3 of Fig. 1.

Referring to Fig. 2 the mold 10 is shown in closed position with a plastic composition 51 filling the mold cavity and forming a mounting on lens 25. It will be apparent that the mold cavity is defined on the innermost surface by the secondary zonal clamping members 26 and 45 rather than by primary zonal clamping members 24 and 44 as in previous types of lens centering molds. Other members constituting the walls of the mold cavity are evident from the drawings. Fig. 3 is a sectional view taken along the lines 3—3 of Fig. 1.

It will be evident from Fig. 1 that as the mold 10 is closed, uncentered lens 25 will first be contacted on each side by the primary zonal clamping members 24 and 44. The lens 25 will, therefore, be quite accurately optically centered by this centering pressure. However, in some instances due to friction between the primary clamps 24 and 44 and the lens 25, the lens may still be very slightly off center. This slight centering error will be corrected by the action of the secondary zonal clamping members 26 and 45 which respectively contact the opposite faces of lens 25 momentarily after the primary zonal clamping members have completed their lens centering action but before their pressure on the lens is sufficient to resist further centering movement. The secondary zonal clamping members 26 and 45 will complete the lens centering by overcoming the frictional resistance of the primary clamp. The lens is then firmly held in centered position by complete closing of the mold. It will thus be understood that the secondary clamping members perform two functions, that is, in the first place they aid in giving a final centering adjustment to the lens and, secondly, they define a portion of the inner wall of the mold cavity.

Figure 4:
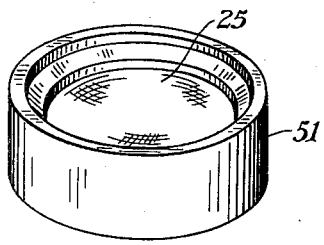
Fig. 4 is a perspective view of the centered lens in its molded rim.

When the mold is completely closed and held under satisfactory pressure, the injection of the hot plastic composition 51 takes place in the usual manner from an injection molding machine, not shown, and the plastic fills the mold as shown in Fig. 2. After the plastic is hardened as is customary by cooling the mold, the mold blocks 11 and 12 are separated and the optically centered lens now held in position by its plastic mounting is removed from the mold cavity. The mounted lens is shown in Fig. 4. The periphery of the molded mounting will be centered on the optic axis of the lens.

Undesired flash on the mounting can be removed by usual methods. As the mold blocks 11 and 12 become disengaged from each other on opening of the mold, the movable members 18, 36 and 35 are restored by spring action to the positions about as shown in Fig. 1 and the operation can be repeated.

While only a single cavity mold has been described, it is obvious that a multiple cavity mold could be assembled which would incorporate my novel structure as respects more than one mold cavity.

Although the invention has been described in connection with a round lens, it will be understood the periphery of the lens and/or the molded mounting may be of any shape which has a center such as a circle, an elipse, a square, a rectangle or even a triangle, although the commonest forms are, of course, a circle and a rectangle. Centering lenses of relatively large diameters are effectively accomplished by my novel mold.

During all subsequent operations or applications to which the lens centered in the plastic mounting is put, it can be handled in the same manner as the lens which is centered by grinding and has the additional advantage of having a plastic rim which may have any predetermined outline and shape according to the mold employed.

My novel mold may be employed to mold optically centered rims on all lenses either positive or negative, compound or simple. Various plastic molding compounds may be employed to form the lens mounting such as thermoplastic or thermosetting resins. Cellulose ester compositions such as cellulose acetate may be employed advantageously as can the various glass-like acrylate and methacrylate resins.

What I claim and desire to secure by Letters Patent of the United States is:

1. In an injection mold adapted to optically center an uncentered lens and to mold a peripheral mounting on said lens after it is centered, the combination of a primary pair of axially aligned coacting lens centering clamps of a diameter relatively smaller than the diameter of the lens with a secondary pair of coaxially aligned lens centering clamps concentric with said primary pair and of a diameter greater than that of said primary clamps for providing additional centering of greater precision than is provided by said primary clamps, and means for actuating the primary and secondary clamps successively.

2. In an injection mold adapted to optically center an uncentered lens and to mold a peripheral mounting on said lens after it is centered, the combination of a primary pair of coacting axially aligned cup centering circular lens clamps of relatively small diameter with a secondary pair of coacting axially aligned cup centering circular lens clamps concentric with the primary pair and of greater diameter for providing additional centering of greater precision than is provided by said primary clamps, and means for actuating the primary and secondary clamps successively.

3. In an injection mold adapted to optically center an uncentered lens and to mold a peripheral mounting on said lens after it is centered, cooperating members forming a mold cavity in which the lens is to be centered, a primary pair of axially aligned cup centering circular lens clamps of relatively small diameter, a secondary pair of axially aligned cup centering circular lens clamps concentric with the primary pair and of greater diameter for providing additional centering of greater precision than is provided by said primary clamps, means including said secondary clamping members for defining a portion of the inner wall of said mold cavity and means for actuating the primary and secondary clamps successively.

4. In an injection mold adapted to optically center an uncentered lens and to mold a peripheral mounting on said lens after it is centered, cooperating members forming a mold cavity in which the lens is to be centered, a primary pair of axially aligned cup centering circular lens clamps of relatively small diameter, a secondary pair of axially aligned cup centering circular lens clamps concentric with the primary pair, each member of the secondary pair of clamps being of a diameter greater than that of said first pair and one being of a greater diameter than the other, for providing additional centering of greater precision than is provided by said primary clamps, means including said secondary clamping members for defining a portion of the inner wall of said mold cavity and means for actuating the primary and secondary clamps successively.

5. In an injection mold adapted to open and close and to optically center an uncentered lens and to mold a peripheral mounting on said lens after it is centered, a primary pair of axially aligned lens centering clamps, one of said clamps supporting the lens when the mold is open and both of said clamps adapted to engage opposite surfaces of the lens when the mold is closed, a pair of pistons for respectively moving said primary clamps toward and away from each other, means including springs for holding the clamps against the lens under spring pressure when the mold is closed and for moving the clamps away from the clamping position when the mold is opened, a secondary pair of axially aligned lens centering clamps concentric with the primary pair and of greater diameter than the primary clamps but of a lesser diameter than the lens for providing additional centering of greater precision than is provided by said primary clamps, and means including a spring for holding one of the pair of secondary clamps against the lens under spring pressure when the mold is closed and for moving that clamp away from the clamping position when the mold is opened.

6. In an injection mold adapted to open and close and to optically center an uncentered lens and to mold a peripheral mounting on said lens after it is centered, a lower mold section comprising a base member with a cylindrical aperture therein, a sleeve member positioned on the base member having a cylindrical bore therein which is positioned in alignment with said cylindrical aperture thereby forming a continuous cylindrical space of appreciable length, a piston adapted to be vertically moved in said cylindrical space, spring means associated with the piston adapted to support the piston on spring pressure when the mold is closed and to force the piston upwardly to a normal position when the mold is open, a cup centering circular lens clamp positioned on the upper end of said piston adapted to engage the lens to be centered, another cup centering circular lens clamp positioned on the upper perimeter of said hollow cylindrical member also adapted to engage the lens to be centered, an upper mold section comprising a base member, a member supported by the base member having a cylindrical bore therein, the upper portion of the bore being of greater diameter than the lower portion thereby forming circular shoulder on the inner surface of the member, a cylindrical sleeve placed in said bore the upper portion of its outer diameter being greater than the lower portion thereof, thereby forming a circular shoulder on the outer surface of the sleeve which will engage the complimentary shoulder on said other member, the sleeve also having an apertured wall positioned crosswise of the interior of the sleeve and forming an upper and lower chamber in the sleeve, a spring positioned in the upper chamber between said wall and the base member adapted to exert spring pressure on said sleeve member when the mold is closed and to return the sleeve member to normal position when the mold is opened, a cup centering circular lens clamp positioned on the lower perimeter of said sleeve adapted to engage the lens being centered, a piston attached to a piston rod and movably positioned in the lower chamber of said sleeve with the piston rod movable through the aperture in said wall, a cup centering circular lens clamp positioned on the lower end of said piston adapted to engage the lens being centered, a spring positioned between the piston and said wall adapted to hold the piston against the lens under spring pressure when the mold is closed and to return the piston to a normal position when the mold is open.

HOWARD G. FAY.

REFERENCES CITED

The following references are of record in the file of this patent:

UNITED STATES PATENTS

| Number | Name | Date |
| --- | --- | --- |
| 2,193,935 | Mulcahy | Mar. 19, 1940 |
| 2,304,984 | Wood | Dec. 15, 1942 |